US009172883B2

(12) United States Patent
Koyanagi et al.

(10) Patent No.: US 9,172,883 B2
(45) Date of Patent: Oct. 27, 2015

(54) IMAGING APPARATUS WITH A FINDER DEVICE HAVING AT LEAST ONE VARIABLE MAGNIFICATION LENS WHICH CAN BE INSERTED INTO AND REMOVED FROM AN OPTICAL PATH OF THE FINDER DEVICE

(71) Applicant: FUJIFILM Corporation, Tokyo (JP)

(72) Inventors: Masayuki Koyanagi, Saitama (JP); Tadashi Jogetsu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 30 days.

(21) Appl. No.: 14/227,600

(22) Filed: Mar. 27, 2014

(65) Prior Publication Data
US 2014/0211068 A1    Jul. 31, 2014

Related U.S. Application Data

(63) Continuation of application No. PCT/JP2012/071069, filed on Aug. 21, 2012.

(30) Foreign Application Priority Data

Sep. 28, 2011  (JP) .................................. 2011-213127

(51) Int. Cl.
   *H04N 5/232*      (2006.01)
   *G03B 13/12*      (2006.01)
   *G03B 17/20*      (2006.01)

(52) U.S. Cl.
   CPC ............ *H04N 5/23296* (2013.01); *G03B 13/12* (2013.01); *G03B 17/20* (2013.01); *H04N 5/23293* (2013.01)

(58) Field of Classification Search
   CPC ............ H04N 5/2254; H04N 5/23293; H04N 5/23212; H04N 5/23296
   See application file for complete search history.

(56) References Cited

U.S. PATENT DOCUMENTS 6,041,195 A * 3/2000 Honda et al. ................. 396/429
6,137,957 A   10/2000 Kobayashi et al.
6,295,419 B1  9/2001 Kobayashi et al.
(Continued)

FOREIGN PATENT DOCUMENTS

JP   1-217432 A   8/1989
JP   6-22185 A    1/1994
(Continued)

OTHER PUBLICATIONS

International Search Report for PCT/JP2012/071069 mailed on Nov. 20, 2012.
(Continued)

*Primary Examiner* — Ahmed A Berhan
(74) *Attorney, Agent, or Firm* — Birch, Stewart, Kolasch & Birch, LLP

(57) ABSTRACT

A camera 10 has an imaging optical system, an imaging device 21a, and a finder device 15. The finder device 15 includes a variable magnification lens 64 which can be inserted into and removed from an optical path, and a shutter 62 which can switch between a closed state in which it interrupts light coming from a finder window 16 and an open state in which it allows passage of light coming from the finder window 16. The camera 10 is equipped with a driver 54 for controlling insertion and removal of the variable magnification lens 64 in accordance with the focal length of the imaging optical system, a driver 53 for controlling the state of the shutter 62, and a CPU 82. The CPU 82 controls the shutter 62 so that it is kept in the closed state while the variable magnification lens 64 is being moved.

10 Claims, 15 Drawing Sheets

(56) References Cited

U.S. PATENT DOCUMENTS

| | | | |
|---|---|---|---|
| 7,656,454 B2 * | 2/2010 | Kojima | 348/344 |
| 8,123,418 B2 * | 2/2012 | Fujii | 396/354 |
| 2002/0001465 A1 | 1/2002 | Kobayashi et al. | |

FOREIGN PATENT DOCUMENTS

| | | | |
|---|---|---|---|
| JP | 11-38477 A | 2/1999 | |
| JP | 11-242262 A | 9/1999 | |
| JP | 2009-200552 A | 9/2009 | |
| JP | 2011-91673 A | 5/2011 | |

OTHER PUBLICATIONS

Written Opinion of the International Searching Authority for PCT/JP2012/071069 mailed on Nov. 20, 2012.

* cited by examiner

SHOT IMAGE IMMEDIATELY BEFORE INSERTION
OF VARIABLE MAGNIFICATION LENS

FINDER OBSERVATION IMAGE (EVF DISPLAY IMAGE)

FINDER OBSERVATION IMAGE (EVF DISPLAY IMAGE)

FINDER OBSERVATION IMAGE (EVF DISPLAY IMAGE)

FINDER OBSERVATION IMAGE (OVF IMAGE AND EVF FRAME)

IMAGING APPARATUS WITH A FINDER DEVICE HAVING AT LEAST ONE VARIABLE MAGNIFICATION LENS WHICH CAN BE INSERTED INTO AND REMOVED FROM AN OPTICAL PATH OF THE FINDER DEVICE

CROSS REFERENCE TO RELATED APPLICATION

This is a continuation of International Application No. PCT/JP2012/071069 filed on Aug. 21, 2012, and claims priority from Japanese Patent Application No. 2011-213127 filed on Sep. 28, 2011, the entire disclosure of which is incorporated herein by reference.

TECHNICAL FIELD

The present invention relates to an imaging apparatus incorporating a finder device.

BACKGROUND ART

Finder structures of imaging apparatus which make it possible to vary the finder magnification by a simple mechanism in accordance with the focal length of an imaging optical system have been proposed (refer to Patent documents 1 and 2).

The imaging apparatus disclosed in Patent documents 1 and 2 are configured so that one of a wide-angle-side lens and a telephoto-side lens which are variable magnification lenses can be inserted into the optical path of a finder device and that the finder magnification can easily be varied in accordance with the focal length of the imaging optical system.

PRIOR ART DOCUMENTS

Patent Documents

Patent document 1: JP-A-11-38477
Patent document 2: JP-A-1-217432

SUMMARY OF THE INVENTION

Problems to be Solved by the Invention

In finder devices having structures as disclosed in Patent documents 1 and 2, a variable magnification lens is inserted into and removed from the optical path mechanically. Therefore, an optical image that is seen through the eyepiece window of the finder device is distorted from the start to completion of a movement of the variable magnification lens. The movement of the variable magnification lens takes, for example, about one to two seconds and hence the time during which an optical image is distorted is not negligibly short. As a result, finder devices having such structures that a variable magnification lens is inserted and removed mechanically cause an observer to feel uncomfortable during a movement of the variable magnification lens.

The present invention has been made in the above circumstances, and an object of the present invention is to provide an imaging apparatus which can vary the finder magnification without causing an observer of a finder device to feel uncomfortable.

Means for Solving the Problems

The present invention provides an imaging apparatus having an imaging optical system whose focal length is variable, an imaging device which performs shooting through the imaging optical system, and a finder device which enables observation of a subject through an optical system that is different from the imaging optical system, wherein the finder device comprises at least one variable magnification lens which can be inserted into and removed from an optical path of the finder device and serves to vary the focal length of the finder device, and a finder shutter which can switch between a closed state in which it interrupts light coming from a subject-side finder window of the finder device and thereby prohibits incidence of the light on an eyepiece window of the finder device and an open state in which it allows passage of light coming from the subject-side finder window and thereby causes the light to shine on the eyepiece window; the imaging apparatus comprises a variable magnification lens control unit for controlling insertion and removal of the variable magnification lens in accordance with the focal length of the imaging optical system, and a finder shutter control unit for controlling the state of the finder shutter; and the finder shutter control unit controls the finder shutter so that it is kept in the closed state while the variable magnification lens is being moved by the variable magnification lens control unit for its insertion or removal.

Advantages of the Invention

The invention makes it possible to provide an imaging apparatus which can vary the finder magnification without causing an observer of a finder device to feel uncomfortable.

BRIEF DESCRIPTION OF THE DRAWINGS

FIGS. 10A, 10B, 100, 10D and 10E show example observation images that are seen through the eyepiece window 17 of the finder device 15.

MODES FOR CARRYING OUT THE INVENTION

An embodiment of the present invention will be hereinafter described with reference to the drawings. The following description will be directed to a digital camera as an imaging apparatus.

Figure 1:
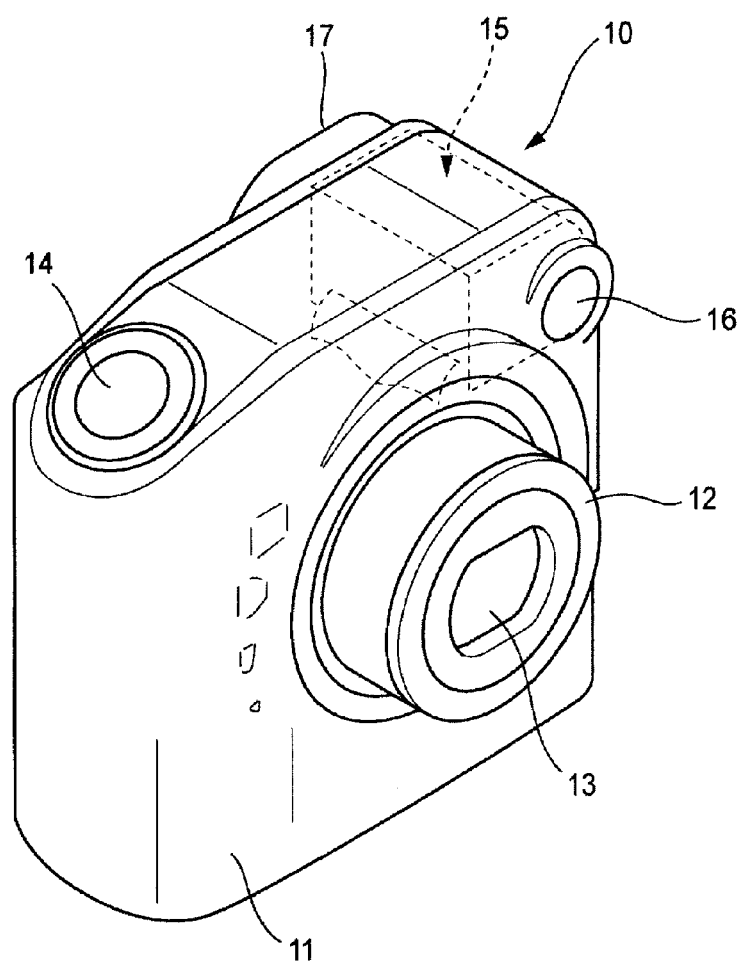
FIG. 1 is a perspective view showing an appearance of a digital camera for description of an embodiment of the present invention.

FIG. 1 is a perspective view showing an appearance of a digital camera for description of the embodiment of the invention.

The digital camera 10 is equipped with a rectangular body 11. The front surface of the body 11 is provided with a retractable lens barrel 12 at the center. An imaging lenses (a focusing lens for focusing position adjustment, a zoom lens, etc.) 13 are housed in the lens barrel 12.

A shutter release button 14 is provided on one side in the top surface of the body 11. A finder device 15 is provided at the corner, opposite to the shutter release button 14, of the body 11 adjacent to its top surface. A subject-side finder window 16 of the finder device 15 is provided at a corner of the front surface of the body 11. An eyepiece window 17 of the finder device 15 is provided in the back surface of the body 11 at such a position as to be opposed to the subject-side finder window 16.

Figure 2:
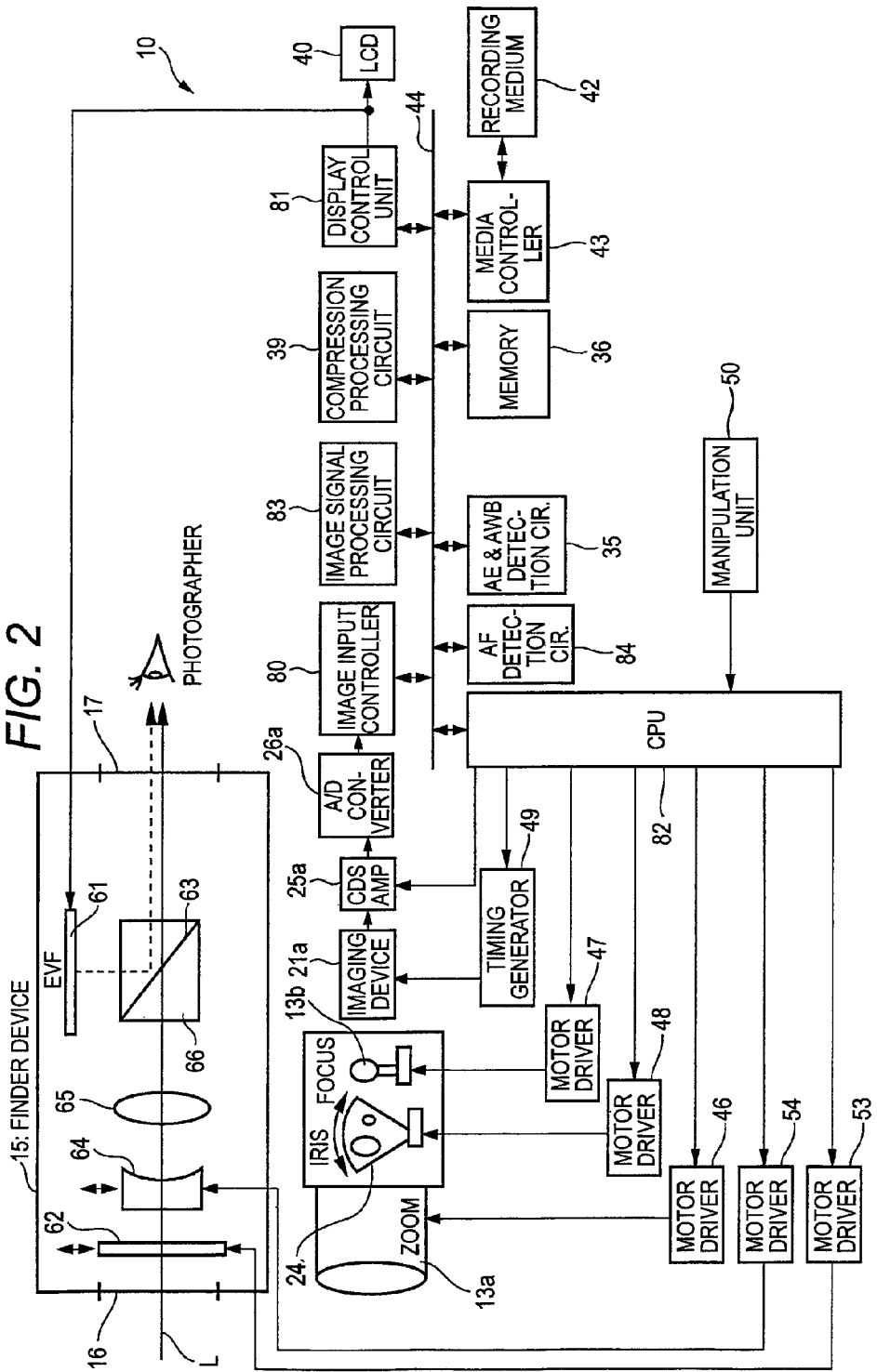
FIG. 2 is a block diagram showing the internal configuration of the digital camera 10 shown in FIG. 1.

FIG. 2 is a block diagram showing the internal configuration of the digital camera 10 shown in FIG. 1.

The digital camera 10 is equipped with a CCD solid-state imaging device 21a, an imaging optical system disposed upstream of the solid-state imaging device 21a, a CDS AMP 25a for performing analog signal processing on an output signal (shot image signal) of the solid-state imaging device 21a, an analog-to-digital (A/D) converter 26a for converting an output signal of the CDS AMP 25a into a digital signal, and the finder device 15. The imaging optical system includes the imaging lenses 13 (a zoom lens and a focusing lens are denoted by symbols 13a and 13b, respectively) and an iris 24.

Although in the example of FIG. 2 the solid-state imaging device 21a is of the CCD type, it may be of another type such as the CMOS type).

The finder device 15 is equipped with the subject-side finder window 16, the eyepiece window 17, and OVF shutter 62, a variable magnification lens 64, a fixed-focal-length object lens 65, a prism 66 incorporating a half mirror 63, and a display unit 61. The OVF shutter 62, the variable magnification lens 64, the object lens 65, and the prism 66 are disposed in this order between the subject-side finder window 16 and the eyepiece window 17 along an incidence optical axis L of the finder device 15.

The OVF shutter 62 is disposed in a detachable manner on the optical path extending along the optical axis L. The OVF shutter 62 can assume a closed state in which it is inserted in the optical path of the finder device 15 and an open state in which it is in escape from the optical path of the finder device 15.

In the closed state, the OVF shutter 62 is inserted to such a position as to cover the subject-side finder window 16. Therefore, in the closed state, light that is incident on the subject-side finder window 16 is interrupted by the OVF shutter 62 and does not shine on the eyepiece window 17.

In the open state, the OVF shutter 62 is located at an escape position where it does not cover the subject-side finder window 16. Therefore, in the open state, light that is incident on the subject-side finder window 16 is not interrupted by the OVF shutter 62 and shines on the eyepiece window 17.

The OVF shutter 62 may be either of such a type that a plate-like member that absorbs or reflects light is inserted or removed mechanically or a device (e.g., liquid crystal shutter) whose transmittance can be controlled electrically.

The variable magnification lens 64 is disposed in a detachable manner on the optical path of the finder device 15. The variable magnification lens 64 serves to vary the focal length of the finder device 15 (in this example, increase the focal length to the telephoto side). The variable magnification lens 64 is controlled so as to be placed at such a position as to be in escape from the optical path of the finder device 15 when the focal length (determined by the position of the zoom lens 13a) of the imaging optical system of the digital camera 10 is in a range between a minimum value and a first threshold value. And the variable magnification lens 64 is controlled so as to be placed at such a position as to be inserted in the optical path of the finder device 15 when the focal length of the imaging optical system of the digital camera 10 is in a range between the first threshold value (not inclusive) and a maximum value.

The half mirror 63 is disposed obliquely so as to form 45° with the optical axis L.

The display unit 61, which is, for example, a liquid crystal display device, is disposed adjacent to the half mirror 63 parallel with the optical axis L. The display unit 61 displays information by transmitting light coming from a backlight only for portions where to display information on the display screen and not transmitting light for the other portions (causing black display).

With the above configuration, when the OVF shutter 62 is in the open state, the user can observe, through the eyepiece window 17, an image produced by superimposition of incident light (OVF optical image) that comes from a subject passing through the half mirror 63 and light (an EVF image displayed on the display unit 61) that is emitted from the display unit 61 and reflected by the half mirror 63.

The finder device 15 is used as an optical view finder (OVF) by rendering the OVF shutter 62 in the open state and rendering the display unit 61 in a non-display (off) state. The finder device 15 is used as an electronic view finder (EVF) by rendering the OVF shutter 62 in the closed state and rendering the display unit 61 in a display (on) state.

Furthermore, the user can observe, simultaneously, in the same finder frame, a composition including a subject and an image displayed on the display unit 61 by rendering the OVF shutter 62 in the open state and rendering the display unit 61 in the display state.

It suffices that the finder device 15 allow the user to observe, through the eyepiece window 17, an image produced by superimposition of an image displayed on the display unit 61 and a subject image (OVF optical image) that is seen through the subject-side finder window 16, when the OVF shutter 62 is in the open state. Thus, the finder device 15 may have another configuration. For example, the finder device 15 may be configured in such a manner that the prism 66 and the display unit 61 are removed from the configuration of FIG. 2 and a seethrough display unit is disposed at the position of the prism 66 with its display screen set perpendicular to the optical axis L.

The digital camera 10 is further equipped with the following components. An image input controller 80 takes in a digital shot image signal that is output from the A/D converter 26a. A computing device (CPU) 82 supervises the entire digital camera 10. An image signal processing circuit 83 performs image processing on the shot image signal that has been taken in by the image input controller 80 and thereby generates shot image data. An AF detection circuit 84 detects a focusing position from a shot image signal that is output from the solid-state imaging device 21*a*. An AE & AWB detection circuit 35 detects an exposure and white balance automatically. A memory 36 includes a RAM which is used as a work memory, a ROM for storing various data, etc. A compression processing circuit 39 compresses image-processed shot image data into a JPEG image or an MPEG image. A display control unit 81 serves to display a shot image or a live view image on a liquid crystal device (LCD) 40 provided in, for example, the camera back surface and to display various images (described later) on the display unit 61 provided in the finder device 15. A media controller 43 records the shot image data in a recording medium 42. A bus 44 connects the above components to each other.

A manipulation unit 50 including the shutter release button 14 shown in FIG. 1 and a zoom button is connected to the CPU 82. The CPU 82 controls the digital camera 10 according to a user instruction that is input through the manipulation unit 50.

The digital camera 10 is further equipped with a motor driver 46 for supplying drive pulses to a drive motor of the zoom lens 13*a*, a motor driver 47 for supplying drive pulses to a drive motor of the focusing lens 13*b*, a motor driver 48 for supplying drive pulses to a drive motor which performs an aperture control on the iris 24, a motor driver 53 for supplying drive pulses to a motor which performs a poison control on the OVF shutter 62, a motor driver 54 for supplying drive pulses to a motor which performs a poison control on the variable magnification lens 64, and a timing generator 49 for supplying timing pulses to the solid-state imaging device 21*a*. The motor drivers 46, 47, 48, 53, and 54 and the timing generator 49 operate according to instructions from the CPU 82. The CDS AMP 25*a* also operates according to an instruction from the CPU 82.

Next, a description will be made of how the above configured digital camera 10 operates in a shooting mode. The following description will be made for an example case that the minimum value of the focal length of the imaging optical system of the digital camera 10 is 35 mm, the threshold value (above-mentioned first threshold value) of the focal length for movement of the variable magnification lens 64 is 101 mm, the maximum value of the focal length of the imaging optical system is 150 mm, the focal length of the finder device 15 before insertion of the variable magnification lens 64 is 35 mm, and the focal length of the finder device 15 after insertion of the variable magnification lens 64 is 100 mm. It is assumed that the OVF shutter 62 is in the open state at the time of setting of the shooting mode. It is also assumed that the variable magnification lens 64 is not inserted in the optical path at the time of setting of the shooting mode.

Figure 3:
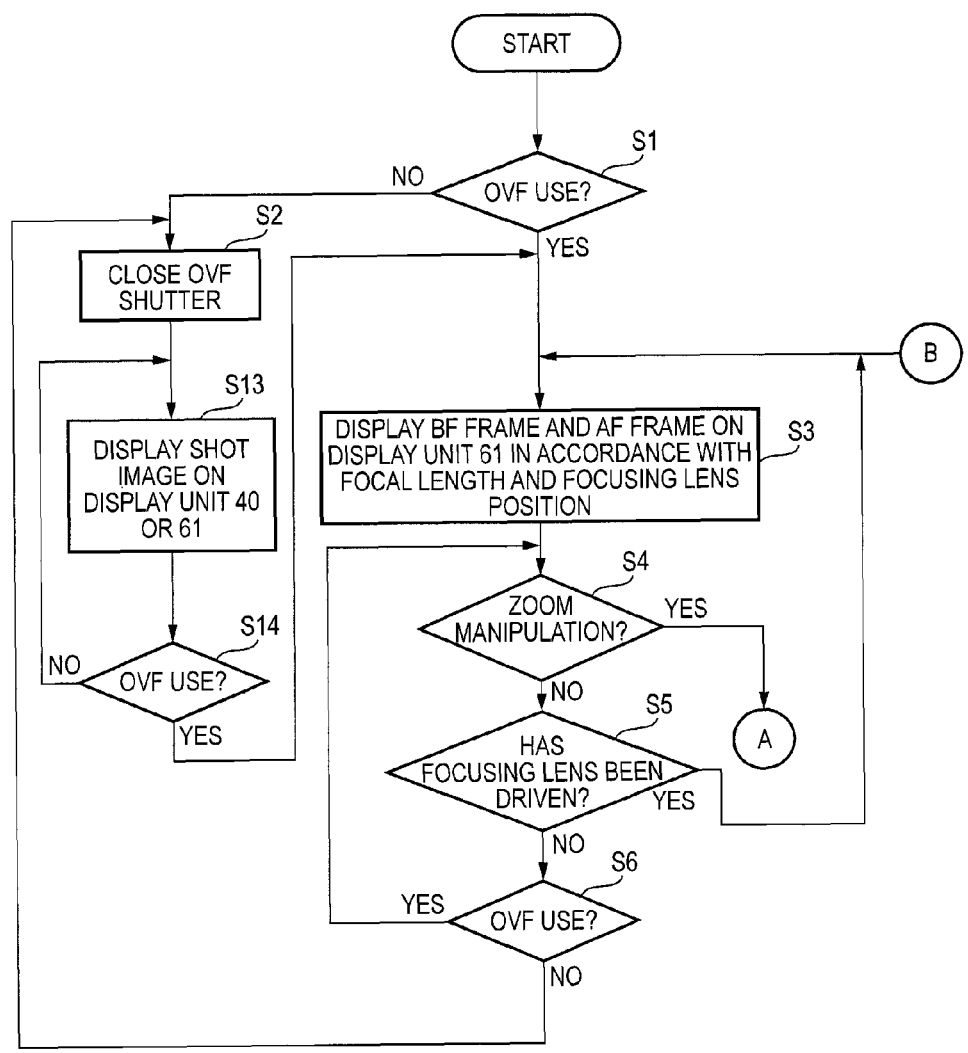
FIG. 3 is a flowchart for description of how the digital camera 10 shown in FIG. 1 operates in a shooting mode.
Figure 4:
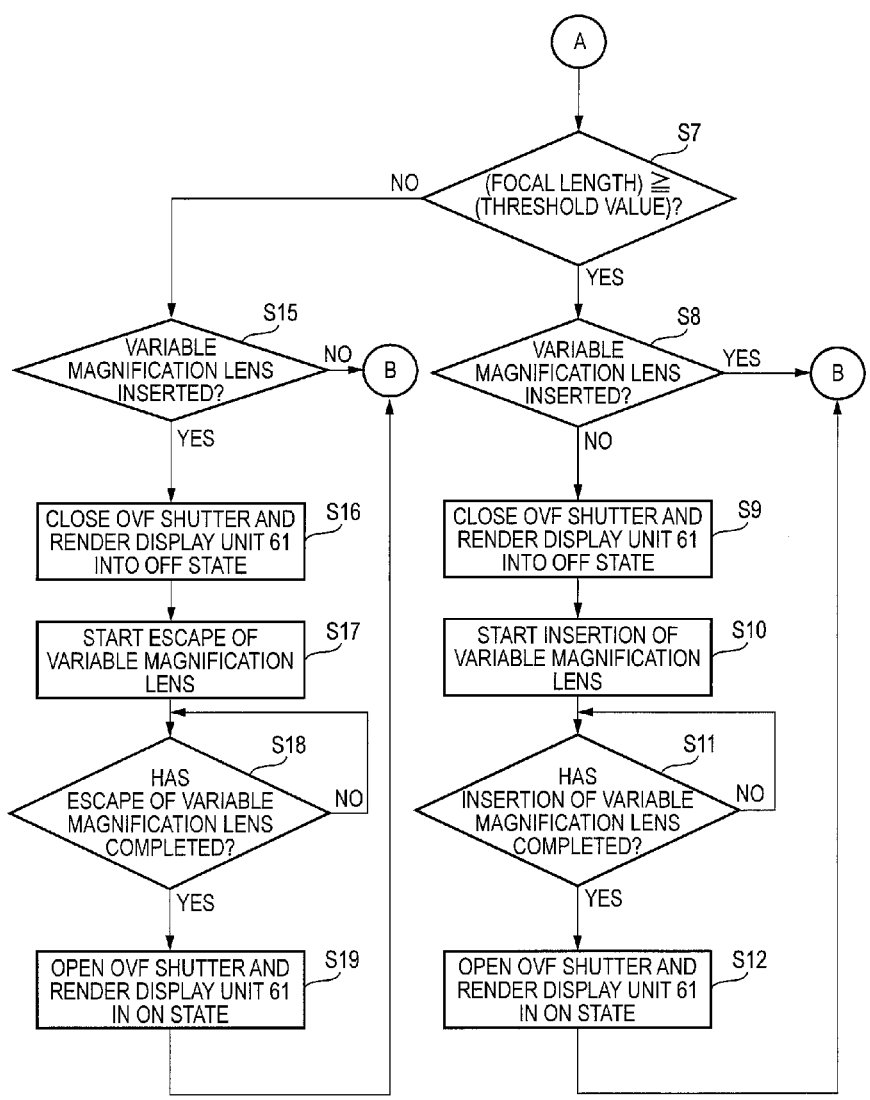
FIG. 4 is another flowchart for description of how the digital camera 10 shown in FIG. 1 operates in the shooting mode.

FIGS. 3 and 4 are flowcharts for description of how the digital camera 10 shown in FIG. 1 operates in the shooting mode.

Upon setting of the shooting mode, the CPU 82 judges whether an OVF mode (a mode in which to observe a subject image through the object lens 65 of the finder device 15) in which the finder device 15 is used as an OVF is set or not (step S1).

If the OVF mode is not set (step S1: no), the CPU 82 controls the OVF shutter 62 to the closed state via the motor driver 53 (step S2). Then the CPU 82 displays a live view image taken by the solid-state imaging device 21*a* on the display unit 61 or the liquid crystal device 40 via the display control unit 81 (step S13). On which display unit to display a live view image can be set by the user. A setting for displaying a live view image on both of the display unit 61 and the liquid crystal device 40 is also possible.

After the execution of step S13, the CPU 82 again checks whether the OVF mode is set. If the OVF mode is set, the CPU 82 controls the OVF shutter 62 to the open state and executes step S3. If the OVF mode is not set, the CPU 82 executes step S13 again.

If the judgment result of step S1 is affirmative, the CPU 82 generates display data of a bright frame (BF frame) indicating a shooting range of the shooting optical system in a subject field range that is seen through the eyepiece window 17 in accordance with a focal length that is determined by a position of the zoom lens 13*a*. The CPU 82 generates display data of an AF frame indicating a focus area in the above shooting range in accordance with a position of the focusing lens 13*b*. Then the CPU 82 sends these display data to the display control unit 81, which displays a BF frame and an AF frame on the display unit 61 on the basis of the display data (step S3).

After the execution of step S3, the CPU 82 judges whether or not a zoom manipulation has been made using the zoom button of the manipulation unit 50 (step S4).

If no zoom manipulation has been made (step S4: no), the CPU 82 judges whether or not the focusing lens 13*b* has been moved (step S5). If the focusing lens 13*b* has been moved (step S5: yes), the CPU 82 returns to step S3, where the CPU 82 updates the AF frame to be displayed on the display unit 61, in accordance with to a position of the focusing lens 13*b*.

If the focusing lens 13*b* has not been moved (step S5: no), at step S6 the CPU 82 judges whether the OVF mode is set or not. If the OVF mode is set (step S6: yes), the CPU 82 returns to step S4. If the OVF mode is not set (step S6: no), the CPU 82 executes step S2.

If a zoom manipulation has been made (step S4: yes), the CPU 82 judges whether or not a new focal length that is a result of the zoom manipulation is greater than or equal to the above-mentioned first threshold value (101 mm) (step S7 in FIG. 4). If the judgment result of step S7 is affirmative, the CPU 82 executes step S8 and the following steps. If the judgment result of step S7 is negative, the CPU 82 executes step S15 and the following steps.

At steps S8 and S15, the CPU 82 judges whether or not the variable magnification lens 64 is inserted in the optical path of the finder device 15.

If judging at step S15 that the variable magnification lens 64 is not inserted in the optical path of the finder device 15 (step S15: no), the CPU 82 executes step S3 in FIG. 3.

Figure 5A:
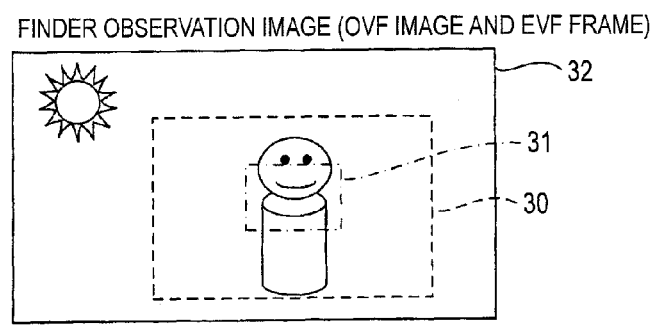
FIGS. 5A, 5B, 5C and 5D show example observation images that are seen through an eyepiece window 17 of a finder device 15.

FIG. 5A shows an observation image that is seen through the eyepiece window 17 of the finder device 15 when the focal length has become equal to 50 mm as a result of a zoom manipulation made after a start of the shooting mode. As shown in this figure, in the observation image a BF frame 30 and an AF frame 31 are superimposed on an OVF optical image 32 that is seen through the subject-side finder window 16.

Figure 5B:
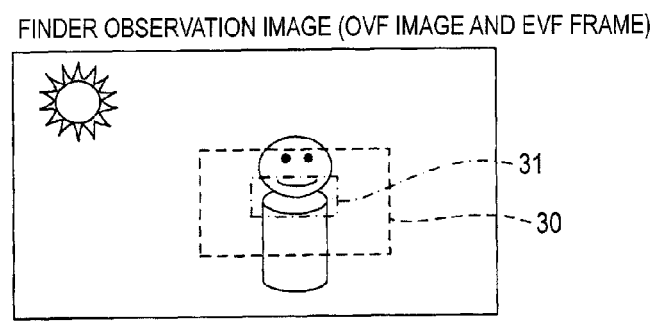

FIG. 5B shows an observation image that is seen through the eyepiece window 17 of the finder device 15 when the focal length has become equal to 100 mm as a result of a zoom manipulation made further to the telephoto side from the state of FIG. 5A (step S7: no and step S15: no). As shown in this figure, the displayed BF frame 30 is made smaller as the focal length is increased by a zoom manipulation.

If judging at step S8 that the variable magnification lens 64 is inserted in the optical path of the finder device 15 (step S8: yes), the CPU 82 executes step S3 in FIG. 3. If judging that the variable magnification lens 64 is not inserted in the optical path of the finder device 15 (step S8: no), the CPU 82 executes step S9.

For example, if the focal length has become equal to 101 mm as a result of a zoom manipulation made from the state of FIG. 5B (focal length: 100 mm), the CPU 82 executes step S9. At step S9, the CPU 82 controls the OVF shutter 62 to the closed state and renders the display unit 61 into the off state (i.e., causes the display unit 61 to perform black display over the entire screen, turns off its backlight, or powers off the display unit 61).

Then the CPU 82 starts insertion of the variable magnification lens 64 into the optical path via the motor driver 54 (step S10).

Figure 5C:
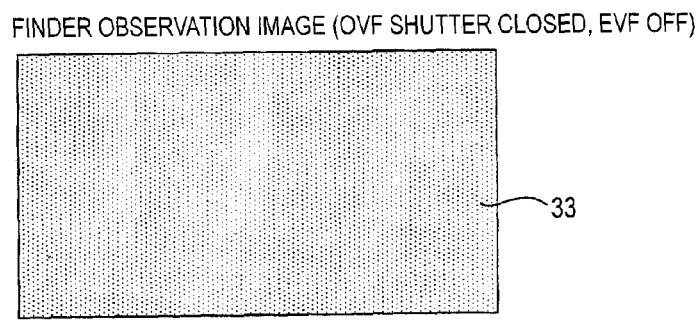

FIG. 5C shows an observation image that is seen through the eyepiece window 17 of the finder device 15 when a zoom manipulation has been made further to the telephoto side from the state of FIG. 5B and step S9 has been executed. As a result of the execution of step S9, the OVF shutter 62 is rendered into the closed state and the display unit is rendered into the off state. As a result, as shown in this figure, an image 33 in which a black picture of the display unit 61 and the image of the OVF shutter 62 itself are superimposed on each other is seen through the eyepiece window 17.

Although movement of the variable magnification lens 64 is started at step S10, at this time the variable magnification lens 64 is shielded from light by the OVF shutter 62. Therefore, the variable magnification lens 64 in motion is not seen through the observation window 17.

After the start of movement of the variable magnification lens 64 (step S10), the CPU 82 judges whether the insertion of the variable magnification lens 64 has been completed or not (step S11). If the insertion of the variable magnification lens 64 has been completed (step S11: yes), the CPU 82 controls the OVF shutter 62 to the open state and renders the display unit 61 into the on state (step S12). Then the CPU 82 executes step S3 in FIG. 3.

Figure 5D:
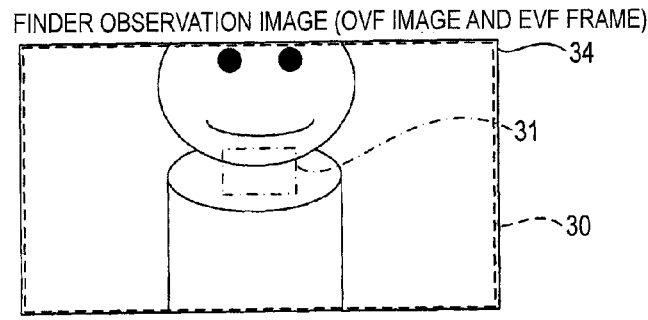

FIG. 5D shows an observation image that is seen through the eyepiece window 17 in a state that the movement of the variable magnification lens 64 (started from the state of FIG. 5C) has been completed. As shown in this figure, after the completion of the movement of the variable magnification lens 64, an image in which the subject image existing in the BF frame 30 shown in FIG. 5B is enlarged is seen through the eyepiece window 17. The BF frame 30 is superimposed so as to be located slightly inside the subject image.

If judging at step S15 that the variable magnification lens 64 is inserted in the optical path of the finder device 15 (step S15: yes), the CPU 82 controls the OVF shutter 62 to the closed state and renders the display unit 61 into the off state (i.e., causes the display unit 61 to perform black display over the entire screen, turns off its backlight, or powers off the display unit 61) (step S16).

For example, if a zoom manipulation to the wide angle side has been made from the state of FIG. 5D and, as a result, the focal length has become equal to 100 mm, the CPU executes step S16. As a result, an observation image as shown in FIG. 5C is obtained.

Then the CPU 82 causes the variable magnification lens 64 to escape from the optical path, via the motor driver 54 (step S17).

Although movement of the variable magnification lens 64 is started at step S17, at this time the variable magnification lens 64 is shielded from light by the OVF shutter 62. Therefore, the variable magnification lens 64 in motion is not seen through the observation window 17.

After the start of escape of the variable magnification lens 64 (step S17), the CPU 82 judges whether the escape of the variable magnification lens 64 has been completed or not (step S18). If the escape of the variable magnification lens 64 has been completed (step S18: yes), the CPU 82 controls the OVF shutter 62 to the open state and renders the display unit 61 into the on state (step S19). Then the CPU 82 executes step S3 in FIG. 3.

As described above, in the digital camera 10, the OVF shutter 62 is closed while the variable magnification lens 64 is being moved in each of the case of inserting the variable magnification lens 64 into the optical path of the finder device 15 and the case of causing the variable magnification lens 64 to escape from the optical path of the finder device 15. With this measure, the user is prevented from feeling uncomfortable due to a variation of an OVF optical image during a movement of the variable magnification lens 64. The usability of the digital camera 10 can thus be enhanced.

Although in the digital camera 10 shown in FIGS. 1 and 2 the finder device 15 incorporates the display unit 61, the above advantages can be attained even if the display unit 61 is omitted.

Figure 6:
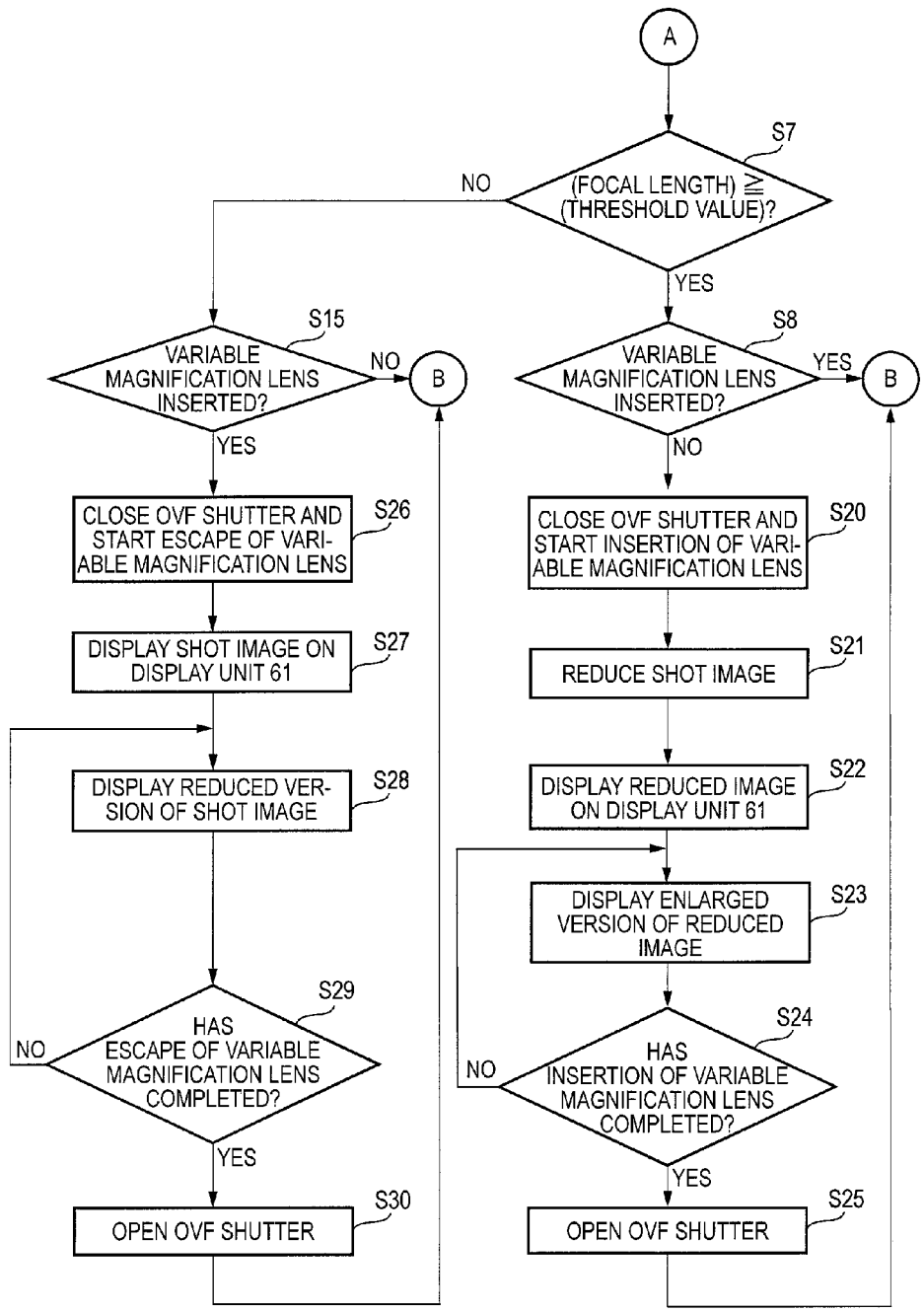
FIG. 6 is a modified version of the flowchart of FIG. 4.

FIG. 6 is a modified version of the flowchart of FIG. 4. Steps in FIG. 6 having the same ones in FIG. 4 will be given the same reference symbols as the latter and descriptions therefor will be omitted.

If the judgment result of step S8 is negative (the focal length has been varied from 100 mm to 101 mm in a state that the variable magnification lens 64 is not inserted in the optical path), the CPU 82 controls the OVF shutter 62 to the closed state and starts insertion of the variable magnification lens 64 (step S20).

Figure 7A:
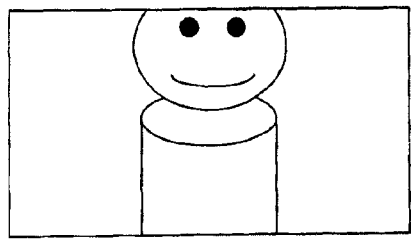
FIGS. 7A, 7B, 7C, 7D and 7E show example observation images that are seen through the eyepiece window 17 of the finder device 15.

Then the CPU 82 acquires shot image data taken by the imaging device 21a immediately before the focal length became equal to 101 mm (i.e., shot image data corresponding to the focal length being equal to 100 mm; see FIG. 7A), and reduces the acquired shot image data to the same size as a BF frame that was displayed immediately before the focal length became equal to 101 mm (i.e., a frame corresponding to the focal length being equal to 100 mm) (step S21).

Then the CPU 82 displays an image (reduced image) on the basis of the reduced shot image data (step S22). At this time, the CPU 82 displays the reduced image at the same position as the BF frame that was displayed when the focal length was equal to 100 mm and causes gray display in the other region.

Figure 7B:
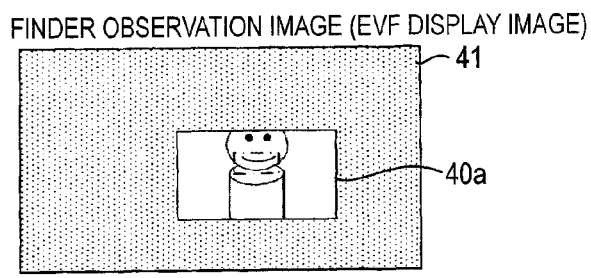

FIG. 7B shows an observation image that is seen through the eyepiece window 17 of the finder device 15 after execution of step S22 in FIG. 6. As shown in this figure, a reduced image 40a is seen at a position where a BF frame was displayed and a gray picture is seen in the other region.

Figure 7C:
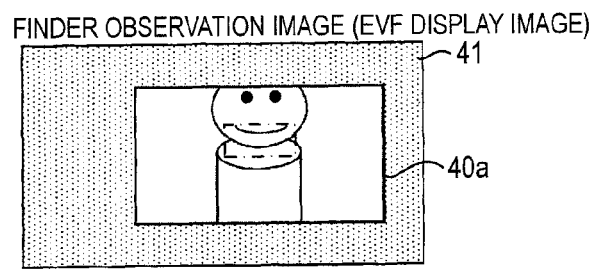

Subsequently, as shown in FIG. 7C, the CPU 82 displays an enlarged version of the reduced image 40a (step S23).

The CPU 82 executes step S23 repeatedly until completion of the insertion of the variable magnification lens 64. That is, upon the start of movement of the variable magnification lens 64, the CPU 82 performs a control of gradually enlarging the reduced image 40a displayed on the display unit 61. The CPU 82 enlarges the reduced image 40a gradually and displays resulting images so that the gray region 41 (see FIGS. 7B and 7C) disappears when the movement of the variable magnification lens 64 is completed.

Figure 7D:
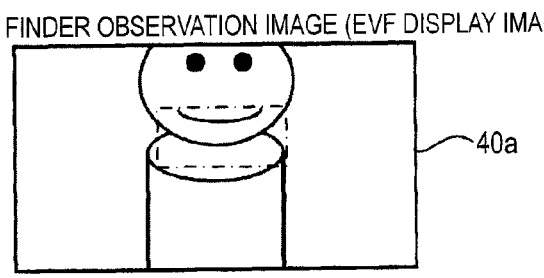

FIG. 7D shows an observation image that is seen through the eyepiece window 17 of the finder device 15 when the movement of the variable magnification lens 64 has been completed. As shown in FIG. 7D, when the movement of the variable magnification lens 64 has been completed, no gray region remains in the observation image and the reduced image 40a is displayed over the entire display screen of the display unit 61.

Upon completion of the insertion of the variable magnification lens 64 (step S24: yes), the CPU 82 controls the OVF shutter 62 to the open state (step S25). Then the CPU 82 executes step S3 in FIG. 3.

Figure 7E:
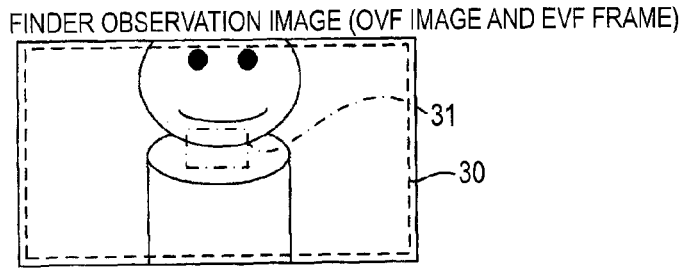

FIG. 7E shows an observation image in which a BF frame 30 and an AF frame 31 are displayed on the display unit 61 as a result of execution of step S25 (the OVF shutter 62 is opened) in the state that the observation image of FIG. 7D is seen and subsequent execution of step S3. After the completion of insertion of the variable magnification lens 64, the focal length of the finder device 15 is made equal to 100 mm. Therefore, an OVF optical image that is approximately the same as the shot image FIG. 7A) that was taken by the imaging device 21*a* when the focal length was equal to 100 mm can be seen through the eyepiece window 17. And the BF frame 30 is displayed, in superimposition, slightly inside this OVF optical image.

If the judgment result of step S15 is affirmative (the focal length has been varied from 101 mm to 100 mm in a state that the variable magnification lens 64 is inserted in the optical path), the CPU 82 controls the OVF shutter 62 to the closed state and causes the variable magnification lens 64 to escape from the optical path (step S26).

After the execution of step S26, the CPU 82 acquires shot image data that was taken by the imaging device 21*a* when the focal length was equal to 101 mm (i.e., shot image data of the image in the BF frame 30 shown in FIG. 7E) and displays this shot image data over the entire display screen of the display unit 61 (step S27).

Then the CPU 82 displays a reduced version of the shot image that is displayed on the display unit 61 (step S28).

The CPU 82 executes step S28 repeatedly until completion of the escape of the variable magnification lens 64. That is, upon the start of movement of the variable magnification lens 64, the CPU 82 performs a control of gradually reducing the shot image displayed on the display unit 61. The CPU 82 displays shot images so that a shot image is displayed at a position where a BF frame corresponding to the focal length being equal to 100 mm should be displayed when the movement of the variable magnification lens 64 is completed. An observation image that is seen through the eyepiece window 17 of the finder device 15 when the movement of the variable magnification lens 64 has been completed is the same as shown in FIG. 7B.

Upon completion of the escape of the variable magnification lens 64 (step S29: yes), the CPU 82 controls the OVF shutter 62 to the open state (step S30). Then the CPU 82 executes step S3 in FIG. 3. When step S3 has been executed, an observation image like the one shown in FIG. 5B, for example, is seen.

As described above, according to this modification, during a movement of the variable magnification lens 64, a varying OVF optical image due to insertion or escape of the variable magnification lens 64 can be expressed in a simulated manner in the form of shot images displayed on the display unit 61. In actuality, the OVF optical image does not vary in the manner shown in FIGS. 7B-7D as the variable magnification lens 64 is inserted or caused to escape. For example, where the variable magnification lens 64 is moved in the horizontal direction, the focal length varies gradually starting from one horizontal end portion of the OVF optical image. Although such a variation results in distortion of an observation image during a movement of the variable magnification lens 64 (described above), in the digital camera 10 this distortion of the observation image is not problematic because the OVF shutter 62 is closed during the movement of the variable magnification lens 64. Furthermore, according to the modification of FIG. 6, the photographer can recognize a varying OVF optical image in a simulated manner. Therefore, an event that an observation image varies rapidly due to a movement of the variable magnification lens 64 can be prevented and hence the load imposed on the photographer can be reduced.

Figure 8:
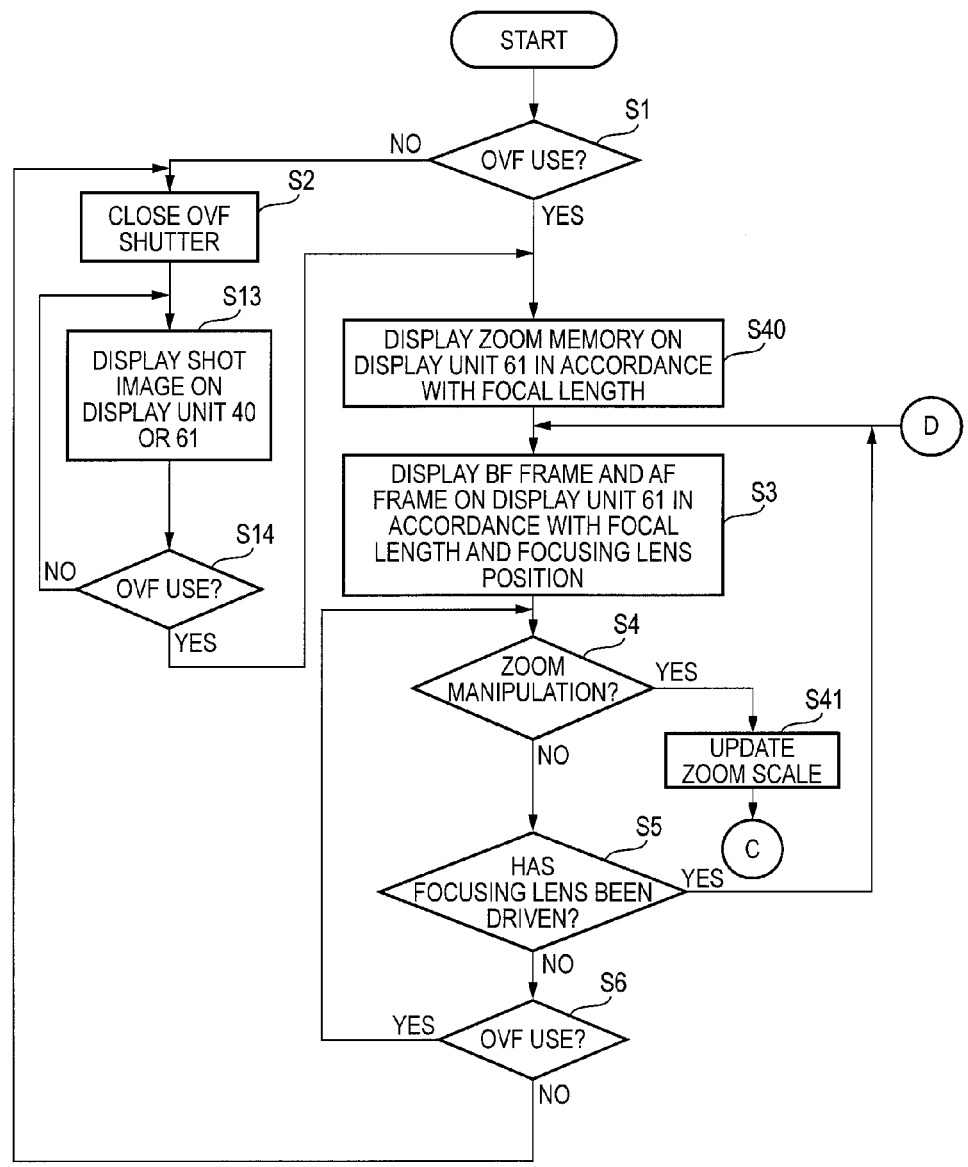
FIG. 8 is a flowchart for description of a process of the digital camera 10 according to a modification.
Figure 9:
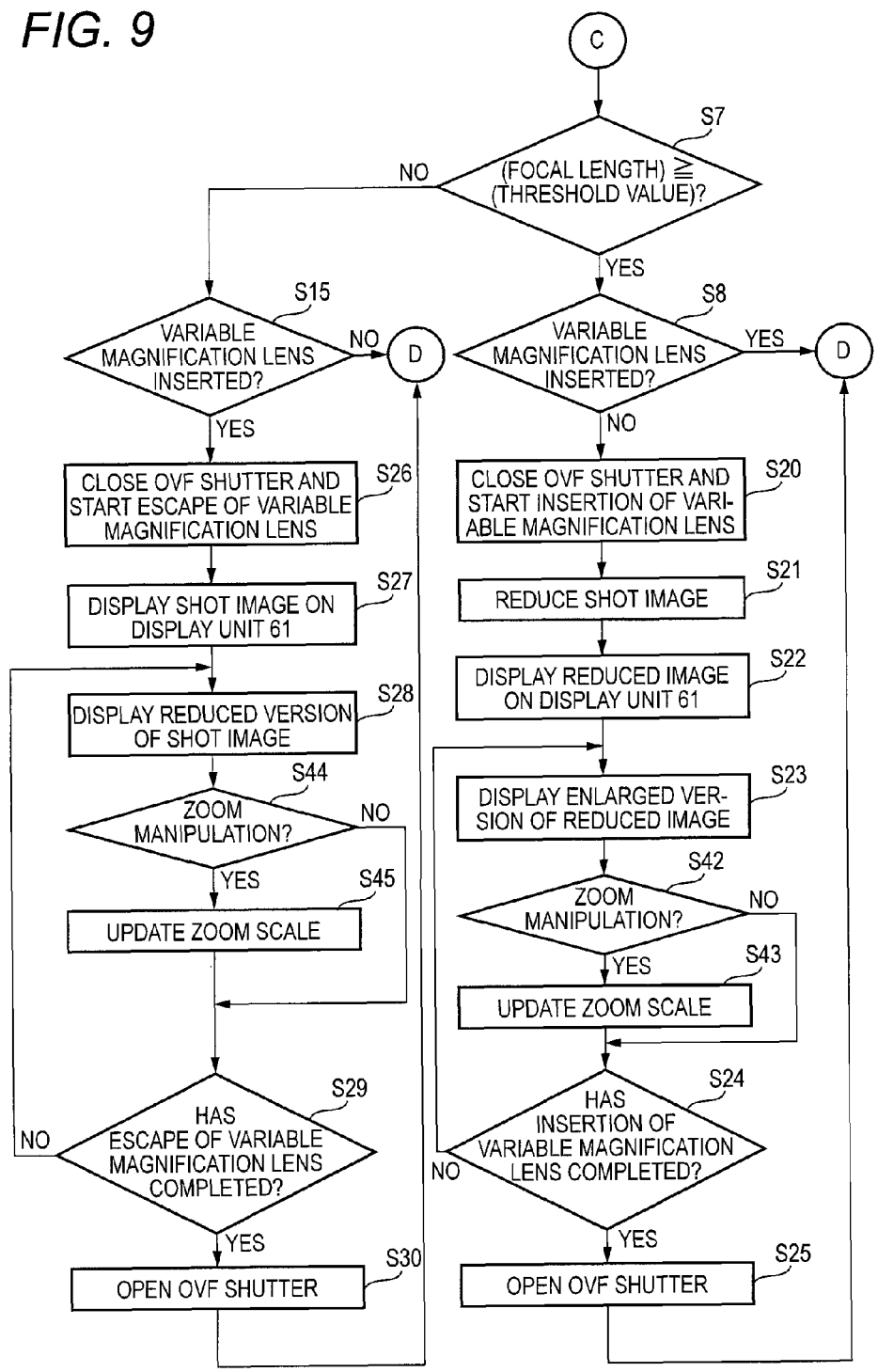
FIG. 9 is another flowchart for description of the process of the digital camera 10 according to the modification.

FIGS. 8 and 9 are flowcharts for description of a process of the digital camera 10 according to another modification.

FIG. 8 is different from FIG. 3 in that step S40 is added between steps S1 and S3 and step S41 is added after step S4. FIG. 9 is different from FIG. 6 in that steps S42 and S43 are added between steps S23 and S24 and steps S44 and S45 are added between steps S28 and S29. In FIGS. 8 and 9, for discrimination from FIGS. 3, 4, and 6, symbols "A" and "B" are changed to "C" and "D," respectively.

At step S40 in FIG. 8, the CPU 82 generates image data for displaying a settable focal length range of the imaging optical system of the digital camera 10 and a current focal length (determined by a position of the zoom lens 13*a*) which is within that range. For example, this image data is data for displaying a zoom scale 70 shown in FIGS. 10A to 10E.

Each of square blocks and a rhombic block contained in the zoom scale 70 shown in FIGS. 10A to 10E corresponds to a prescribed focal length range. For example, blocks of the zoom scale 70 arranged rightward from the left end block correspond to a focal length range 35 to 40 mm, a focal length range 41 to 50 mm, a focal length range 51 to 60 mm, a focal length range 61 to 70 mm, a focal length range 71 to 80 mm, a focal length range 81 to 90 mm, and a focal length range 91 to 100 mm, respectively. The rhombic block of the zoom scale 70 corresponds to a focal length range 101 to 110 mm. The blocks arranged rightward from the rhombic block correspond to a focal length range 111 to 120 mm, a focal length range 121 to 130 mm, a focal length range 131 to 140 mm, and a focal length range 141 to 150 mm, respectively.

In the zoom scale 70, the block corresponding to the focal length range including the above-mentioned first threshold value (101 mm) is displayed so as to be discriminated from the blocks corresponding to the other focal length ranges.

Each block contained in the zoom scale 70 is hatched when the focal length of the imaging optical system of the digital camera 10 has entered the focal length range corresponding to it. Thus, the zoom scale 70 allows the user to roughly recognize a current focal length of the imaging optical system of the digital camera 10.

Figure 10A:
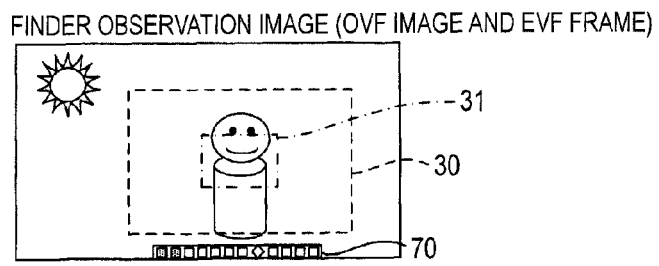
Figure 10B:
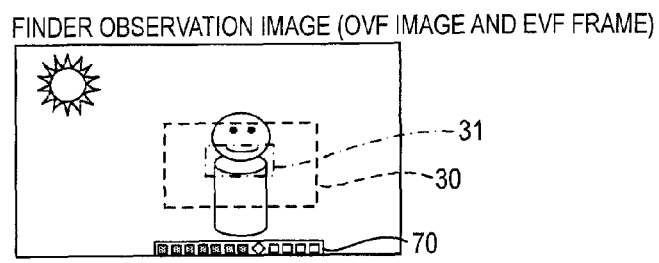

At step S41 in FIG. 8, the CPU 82 performs a control of updating the manner of display of the zoom scale 70 in accordance with a new focal length that is a result of a zoom manipulation. FIG. 10A shows an observation image that is produced when the focal length is equal to 50 mm. FIG. 10B shows an observation image that is produced when the focal length is equal to 100 mm. As shown in FIGS. 10A and 10B, the number of hatched blocks of the zoom scale 70 is increased as the focal length is increased by a zoom manipulation.

Figure 10C:
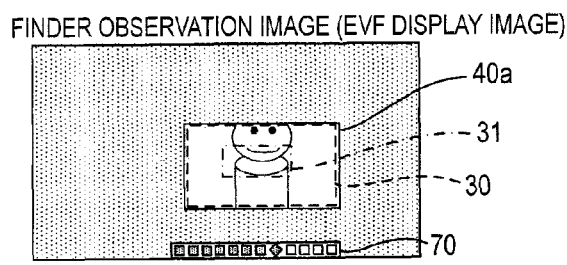

If the focal length has become equal to 101 mm to change the judgment result of step S7 in FIG. 9 to "yes" and steps S20-S22 have been executed with the judgment result of step S8 being "no," as shown in FIG. 10C the rhombic block of the zoom scale 70 is hatched and a reduced image 40*a* is displayed at a position where a BF frame was displayed.

At step S23 in FIG. 9, the CPU 82 starts an operation of enlarging the reduced image 40*a*. At step S42, the CPU 82 judges whether a zoom manipulation has been made or not. If judging that a zoom manipulation has been made (step S42: yes), the CPU 82 updates the manner of display of the zoom scale 70 (step S43).

Figure 10D:
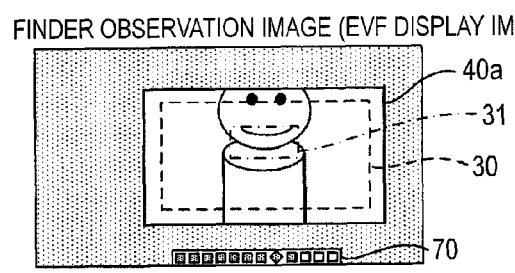
Figure 10E:
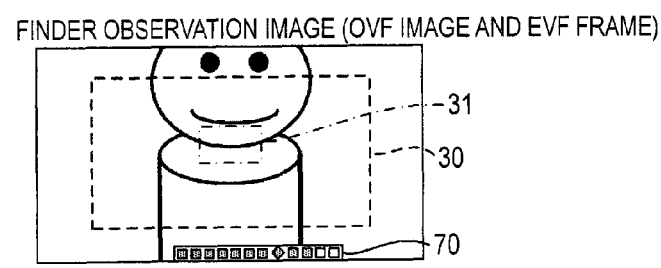

For example, if a time has elapsed from the state of FIG. 10C and a zoom manipulation of increasing the focal length has been made during that time, the observation image is varied to one shown in FIG. 10D. If the movement of the variable magnification lens 64 has been completed and the OVF shutter 62 has been rendered into the open state, the observation image becomes one shown in FIG. 10E.

In causing the variable magnification lens 64 to escape, the CPU 82 operates in a similar manner. After execution of step 28, the CPU 82 judges whether a zoom manipulation has been made or not (step S44). If judging that a zoom manipulation has been made (step S44: yes), the CPU 82 updates the manner of display of the zoom scale 70 (step S45).

As described above, according to the modification of FIGS. 8 and 9, the photographer can see, through the eyepiece window 17 of the finder device 15, the zoom scale 70 which is information indicating the focal length setting range of the imaging optical system and a current focal length of the imaging optical system in the setting range. The zoom scale 70 is displayed in such a manner that the block corresponding to the focal length (101 mm) which is the threshold value for a start of a movement of the variable magnification lens 64 is discriminated from the other blocks. Therefore, the photographer can recognize switching timing of the variable magnification lens 64 by looking at the zoom scale 70 and hence can, for example, adjust a zoom manipulation if he or she does not want to change the finder magnification.

Figure 11:
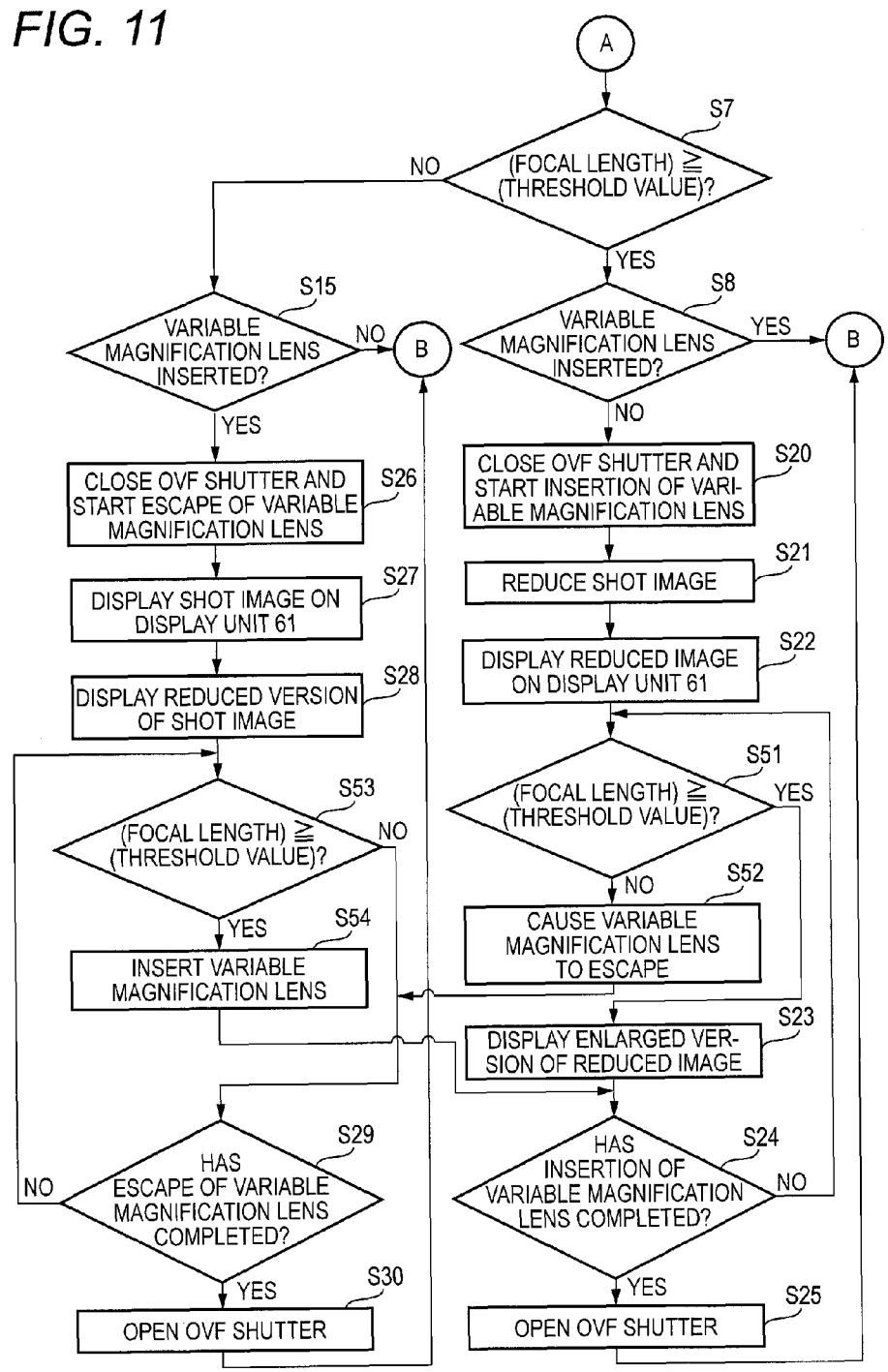
FIG. 11 is a modified version of the flowchart of FIG. 6.

FIG. 11 is a modified version of the flowchart of FIG. 6. FIG. 11 is different from FIG. 6 in that steps S51 and S52 are added after step S22 and steps S53 and S54 are added after step S28.

After execution of step S22 in FIG. 11, the CPU 82 judges whether or not the focal length of the imaging optical system is greater than or equal to the first threshold value (step S51). If the focal length is smaller than the first threshold value (step S51: no), the CPU 82 performs a control of stopping the insertion of the variable magnification lens 64 and causing it to escape (step S52). After the execution of step S52, the CPU 82 executes step S29. For example, the judgment result of step S51 becomes negative when a reverse zoom manipulation has been made to change the focal length to a value that is smaller than or equal to 100 mm after the focal length was changed from 100 mm to 101 mm or larger.

If judging that the focal length of the imaging optical system is greater than or equal to the first threshold value (step S51: yes), the CPU 82 executes step S23.

After execution of step S28 in FIG. 11, the CPU 82 judges whether or not the focal length of the imaging optical system is greater than or equal to the first threshold value (step S53). If the focal length is greater than the first threshold value (step S53: yes), the CPU 82 performs a control of stopping the escape of the variable magnification lens 64 and inserting it (step S54). After the execution of step S54, the CPU 82 executes step S24.

If the focal length is smaller than the first threshold value (step S53: no), the CPU 82 executes step S29.

As described above, according to the modification of FIG. 11, even after a start of a movement of the variable magnification lens 64 by a zoom manipulation, the movement can be stopped depending on the focal length and then the variable magnification lens 64 can be moved in the reverse direction. As a result, a useless movement of the variable magnification lens 64 can be reduced and the time taken from the start of a movement of the variable magnification lens 64 to viewing of a desired OVF optical image can be shortened.

The above description has been made with the assumptions that the minimum value of the focal length of the imaging optical system of the digital camera 10 is 35 mm, the threshold value (above-mentioned first threshold value) of the focal length for movement of the variable magnification lens 64 is 101 mm, the maximum value of the focal length of the imaging optical system is 150 mm, the focal length of the finder device 15 before insertion of the variable magnification lens 64 is 35 mm, and the focal length of the finder device 15 after insertion of the variable magnification lens 64 is 100 mm. These focal length values are example values, and there may occur a case that the minimum value of the focal length of the imaging optical system of the digital camera 10 is shorter than the focal length of the finder device 15 before insertion of the variable magnification lens 64.

Where as mentioned above the minimum value of the focal length of the imaging optical system of the digital camera 10 is shorter than the focal length of the finder device 15 before insertion of the variable magnification lens 64, the user cannot recognize a correct shooting range on the basis of an OVF optical image he or she can see through the eyepiece window 17 of the finder device 15 when a zoom manipulation has been made to the wide angle side of the focal length of the finder device 15 before insertion of the variable magnification lens 64.

In view of the above, in such a case, when the focal length has become shorter than the focal length of the finder device 15 before insertion of the variable magnification lens 64 (i.e., the minimum focal length of the finder device 15), the CPU 82 performs controls of rendering the OVF shutter 62 into the closed state and displaying a shot image being taken by the imaging device 21a on the display unit 61. That is, the CPU 82 causes the finder device 15 to operate as an EVF.

On the other hand, if a zoom manipulation is made to the telephoto side beyond the focal length of the finder device 15 after insertion of the variable magnification lens 64, the BF frame 30 becomes smaller from the state of FIG. 7E, for example. However, if the BF frame 30 becomes too small, the AF frame 31 also becomes too small accordingly, resulting in a situation that it is unclear on what region in a shooting range focusing is made.

In view of the above, if a zoom manipulation is made beyond a prescribed focal length between the focal length of the finder device 15 after insertion of the variable magnification lens 64 (i.e., the maximum focal length of the finder device 15) and the maximum focal length of the imaging optical system, it is preferable for the CPU 82 to perform controls of rendering the OVF shutter 62 into the closed state and displaying a shot image being taken by the imaging device 21a on the display unit 61. That is, in this case, it is preferable for the CPU 82 to cause the finder device 15 to operate as an EVF.

As described above, in the digital camera 10, the finder device 15 is allowed to operate as an EVF around the wide-angle-side end and the telephoto-side end and to operate as an OVF in the focal length range between the wide-angle-side end and the telephoto-side end.

The CPU 82 may set the focal length ranges where the finder device 15 should operate as an EVF and the above-mentioned first threshold value for a start of a movement of the variable magnification lens 64 according to information that is input through the manipulation unit 50.

Figure 12:
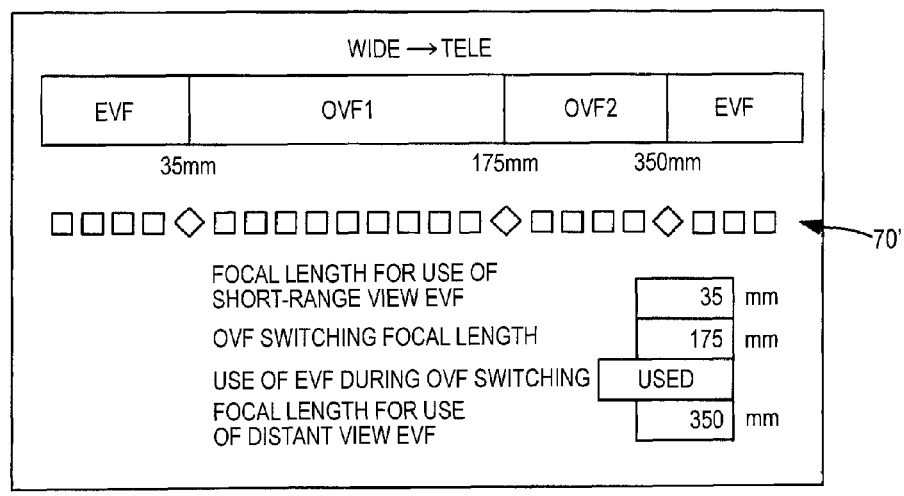
FIG. 12 shows an example setting picture of the digital camera 10.

For example, the CPU 82 displays a setting picture as shown in FIG. 12 on the liquid crystal device 40. The user can specify the focal length on the side of the wide-angle-side end where the finder device 15 should be switched from OVF and EVF by inputting an optional numerical value to a box that is located on the right of a phrase "focal length for use of short-range view EVF" in the setting picture shown in FIG.

12. The user can specify the focal length on the side of the telephoto-side end where the finder device 15 should be switched from OVF to EVF by inputting an optional numerical value to a box that is located on the right of a phrase "focal length for use of distant view EVF" in the setting picture shown in FIG. 12. Furthermore, user can specify the above-mentioned first threshold value by inputting an optional numerical value to a box that is located on the right of a phrase "OVF switching focal length" in the setting picture shown in FIG. 12.

Still further, the user specify whether to display an image on the display unit 61 during a movement of the variable magnification lens 64 by inputting information "used" or "not used" to a box that is located on the right of a phrase "use of EVF during OVF switching." If "not used" is input to this box, as described above with reference to FIGS. 3 and 4, the user can see only a black image through the eyepiece window 17 of the finder device 15 during a movement of the variable magnification lens 64. On the other hand, if "used" is input to this box, as described above with reference to FIG. 6, the user can see a simulated OVF optical image through the eyepiece window 17 of the finder device 15 during a movement of the variable magnification lens 64.

A zoon scale 70' is also displayed in the setting picture of FIG. 12, and the manner of its display is changed in accordance with a set of numerical values that are input to the respective boxes. Blocks corresponding to numerical values that are input to the individual boxes, respectively, are displayed in the form of rhombi so as to be distinguishable from the other blocks.

Figure 13:
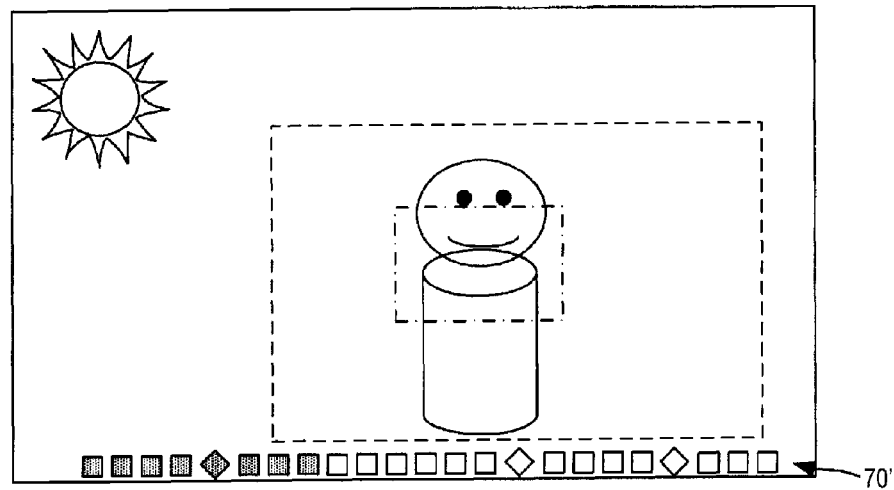
FIG. 13 shows an example observation image that is seen through the eyepiece window 17 of the finder device 15.

FIG. 13 shows an observation image that is seen through the eyepiece window 17 of the finder device 15 in the shooting mode after settings have been made according to the setting picture shown in FIG. 12. As shown in FIG. 13, the use can always see the zoon scale 70' through the eyepiece window 17. Therefore, the user can recognize function switching timing of the finder device 15 in advance and hence can use it in a manner he or she prefers.

Figure 14:
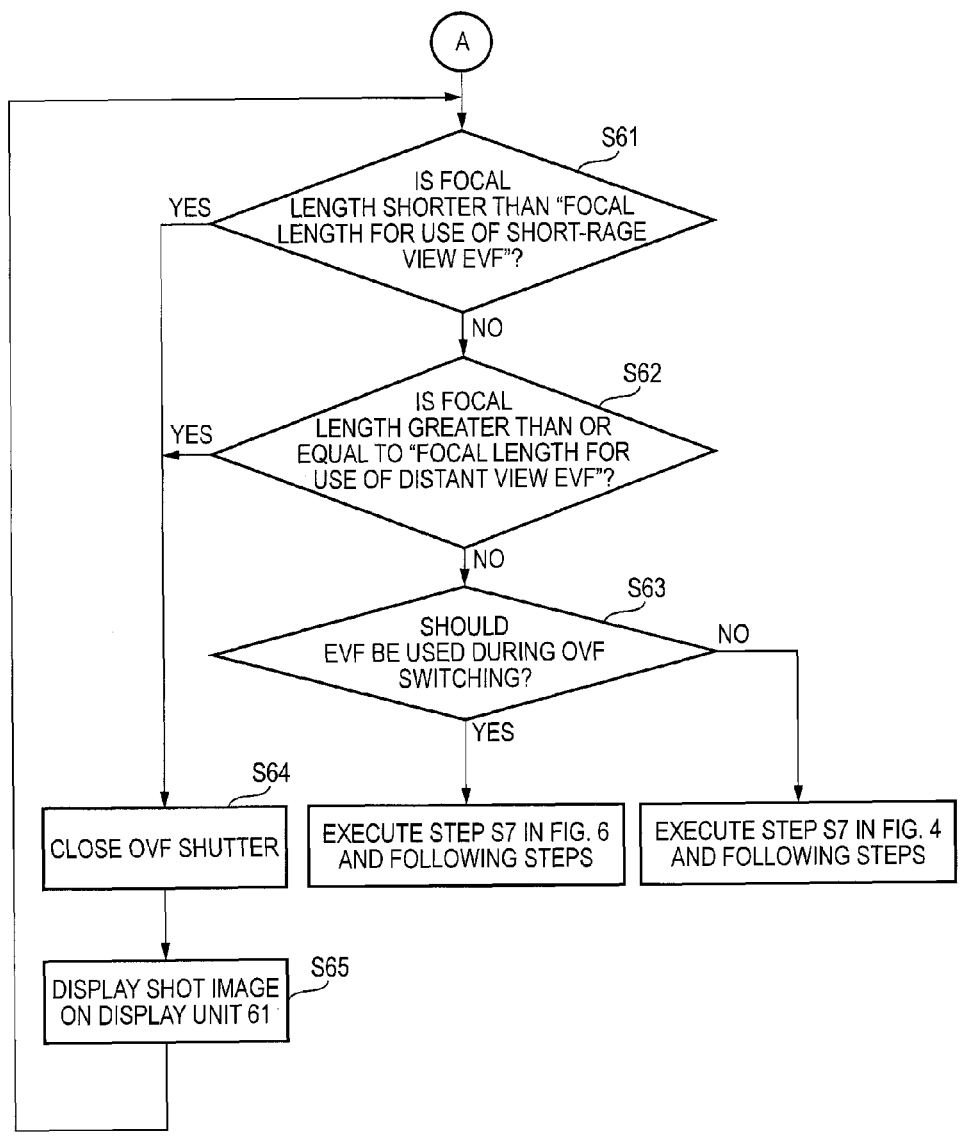
FIG. 14 is a flowchart for description of how the digital camera 10 operates in a shooting mode after various focal lengths were specified according to the setting picture shown in FIG.

FIG. 14 is a flowchart for description of how the digital camera 10 operates in the shooting mode after the various focal lengths were specified according to the setting picture shown in FIG. 12. The point "A" in FIG. 14 is connected to the same in FIG. 3.

If judging at step S4 in FIG. 3 that a zoom manipulation has been made, then the CPU 82 judges whether or not the focal length is shorter than the value that is set as the "focal length for use of short-range view EVF" (step S61). If the judgment result of step S61 is negative, the CPU 82 judges whether or not the focal length is greater than or equal to the value that is set as the "focal length for use of distant view EVF" (step S62). If the judgment result of step S61 or S62 is affirmative, the CPU 82 controls the OVF shutter 62 to the closed state (step S64), displays a shot image taken by the imaging device 21a on the display unit 61 (step S65), and causes the finder device 15 to operate as an EVF. After the execution of step S65, the CPU 82 returns to step S61.

If the judgment result of step S62 is negative, the CPU 82 judges whether or not the setting of "use of EVE during OVF switching" is "used" (step S63). If the judgment result of step S62 is affirmative, the CPU 82 executes step S7 in FIG. 6 and the following steps. If the judgment result of step S62 is negative, the CPU 82 executes step S7 in FIG. 4 and the following steps.

As described above, the finder device 15 is allowed to operate as an EVF around the wide-angle-side end and the telephoto-side end and to operate as an OVF in the focal length range between the wide-angle-side end and the telephoto-side end. Furthermore, since the various focal lengths can be set through the setting picture shown in FIG. 12, the finder device 15 can be customized freely.

As for the above-mentioned first threshold value, a configuration is possible in which different values are set for a case of increasing the focal length and a case of decreasing the focal length.

The above description is directed to the operations in the shooting mode. The shooting mode includes a still image shooting mode in which to record still image data in the recording medium 42 by performing still image shooting, a moving image shooting mode in which to record moving image data consisting of plural still image data in the recording medium 42 by performing continuous shooting, and a live view mode in which to display a live view image on the display unit 61 or the display device 40 by performing continuous shooting. The above-described embodiment can be applied to any of these modes. However, in the moving image shooting mode, a sound of a movement of the variable magnification lens 64 maybe recorded during the movement of the variable magnification lens 64.

In view of the above, it is preferable that the CPU 82 prohibit insertion and removal of the variable magnification lens 64 in the moving image shooting mode.

Figure 15:
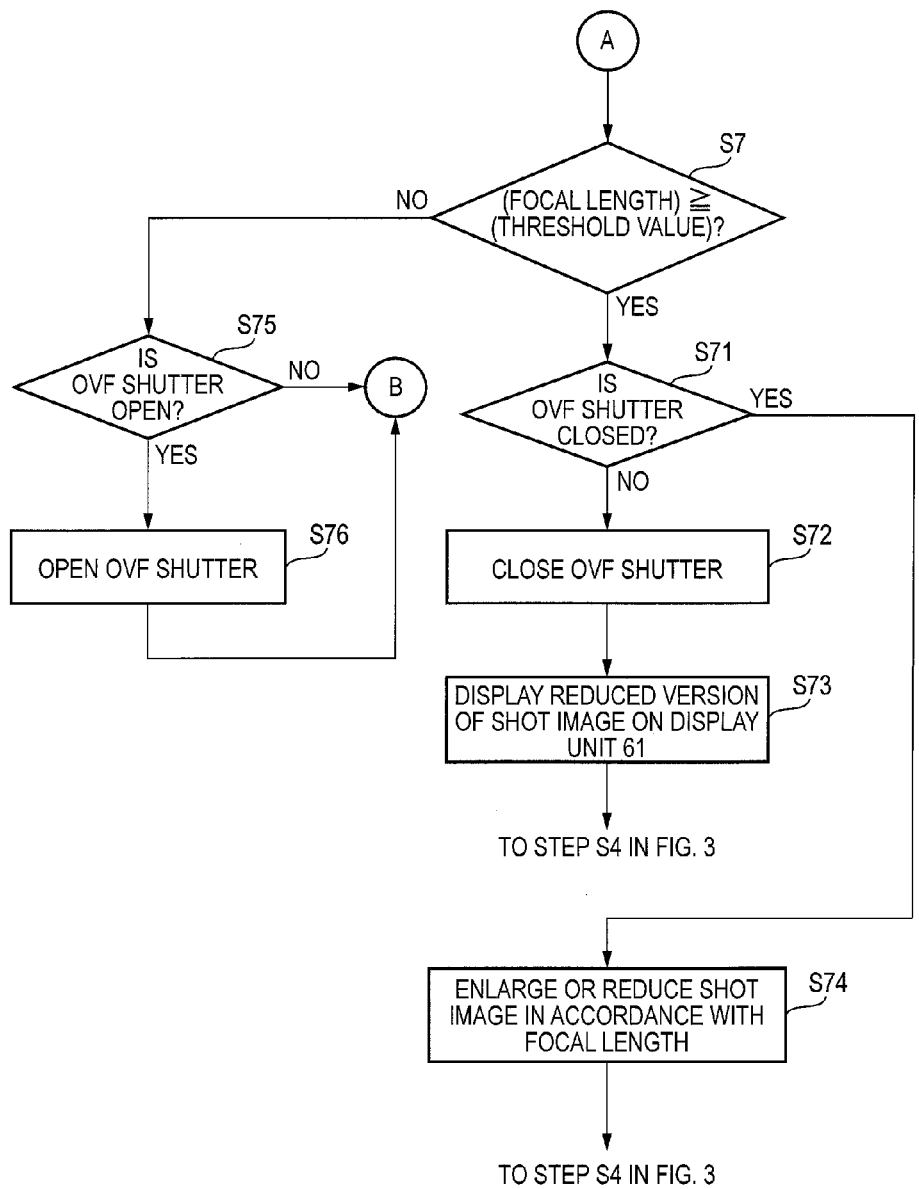
FIG. 15 is a flowchart for description of how the digital camera 10 operates in a moving image shooting mode.

FIG. 15 is a flowchart for description of how the digital camera 10 operates in the moving image shooting mode. Points "A" and "B" in FIG. 15 are connected to those in FIG. 3, respectively.

If a zoom manipulation is made in a state that the OVF shutter 62 is in the open state and a BF frame and an AF frame are displayed on the display unit 61 (step S4 in FIG. 3: yes), step S7 in FIG. 15 is executed.

If the judgment result of step S7 is affirmative, the CPU 82 judges whether the OVF shutter 62 is in the closed state or not (step S71). If the judgment result of step S71 is negative, the CPU 82 controls the OVF shutter 62 to the closed state (step S72) and displays a reduced version of a shot image taken by the imaging device 21a (i.e., a shot image corresponding to the focal length being equal to 100 mm) on the display unit 61 (step S73). At step S73, as instep S21 in FIG. 6, the CPU 82 displays the reduced image at the same position as a BF frame that was displayed when the focal length was equal to 100 mm and causes gray display in the other region. After the execution of step S73, the CPU 82 executes step S4 in FIG. 3.

If the judgment result of step S71 is affirmative, the CPU 82 enlarges or reduces a shot image to be displayed on the display unit 61 in accordance with the focal length (step S74). After the execution of step S74, the CPU 82 executes step S4 in FIG. 3.

Figure 16A:
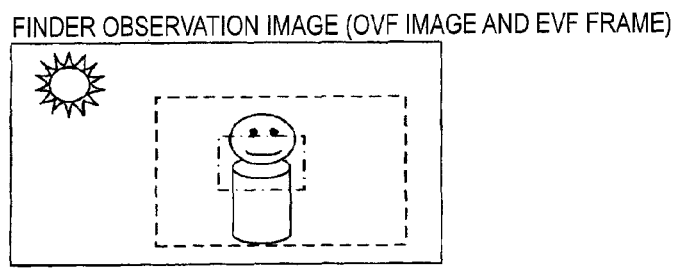
FIGS. 16A, 16B, 16C, 16D and 16E show an example observation image that is seen through the eyepiece window 17 of the finder device 15.
Figure 16B:
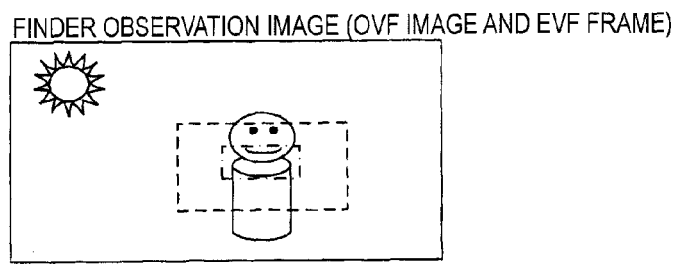

For example, if a zoom manipulation is made to the telephoto side from a state of FIG. 16A, an observation image as shown in FIG. 16B is produced. If a zoom manipulation is made further to the telephoto side to make the focal length equal to 101 mm, an observation image as shown in FIG. 16C is produced.

Figure 16C:
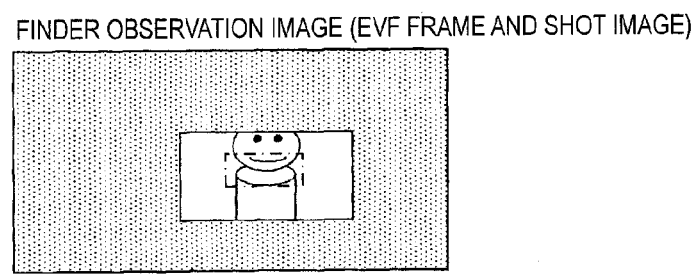
Figure 16D:
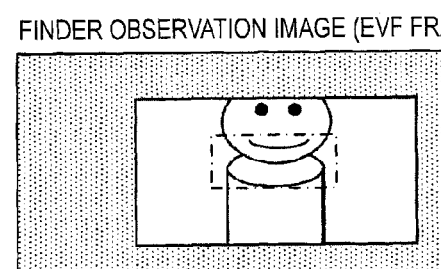
Figure 16E:
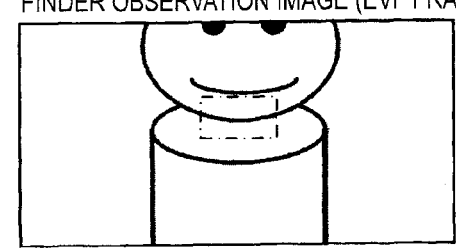

If a zoom manipulation is made to the telephoto side from the state of FIG. 16C, an observation image as shown in FIG. 16D is produced. If a zoom manipulation is made further to the telephoto side, an observation image as shown in FIG. 16E is produced. If a zoom manipulation is made to the wide angle side, the shot image displayed on the display unit 61 is reduced gradually (so as to vary in order of FIG. 16E→FIG. 16D→FIG. 16C).

If the judgment result of step S7 is negative, the CPU 82 judges whether the OVF shutter 62 is in the closed state or not (step S75). If the judgment result of step S75 is affirmative, the CPU 82 controls the OVF shutter 62 to the open state and then executes step S3 in FIG. 3 (the observation image varies from the one shown in FIG. 16C to the one shown in FIG. 16B). If the judgment result of step S75 is negative, the CPU 82 executes step S3 in FIG. 3.

As described above, since movement of the variable magnification lens 64 is prohibited in the moving image shooting mode, undesirable recording of an operation sound of the variable magnification lens 64 can be prevented and high-quality moving image recording is thus made possible.

Furthermore, after the focal length has become greater than or equal to the first threshold value, a shot image is displayed on the display unit 61 with a size that corresponds to a zoom magnification. This prevents an event that the size of a subject image in a shooting range seen through the eyepiece window 17 of the finder device 15 varies rapidly when the focal length is varied past the first threshold value, which prevents the user from feeling uncomfortable.

Although the above description is directed to the case that the finder device 15 of the digital camera 10 includes one variable magnification lens 64, the finder device 15 may be such that it has plural variable magnification lenses 64 and one of them can be selected and inserted.

As described above, this specification discloses the following items.

The disclosed imaging apparatus has an imaging optical system whose focal length is variable, an imaging device which performs shooting through the imaging optical system, and a finder device which enables observation of a subject through an optical system that is different from the imaging optical system, wherein the finder device comprises at least one variable magnification lens which can be inserted into and removed from an optical path of the finder device and serves to vary the focal length of the finder device, and a finder shutter which can switch between a closed state in which it interrupts light coming from a subject-side finder window of the finder device and thereby prohibits incidence of the light on an eyepiece window of the finder device and an open state in which it allows passage of light coming from the subject-side finder window and thereby causes the light to shine on the eyepiece window; the imaging apparatus comprises a variable magnification lens control unit for controlling insertion and removal of the variable magnification lens in accordance with the focal length of the imaging optical system, and a finder shutter control unit for controlling the state of the finder shutter; and the finder shutter control unit controls the finder shutter so that it is kept in the closed state while the variable magnification lens is being moved by the variable magnification lens control unit for its insertion or removal.

In the disclosed imaging apparatus, the finder device includes a display unit for displaying an image; the image displayed on the display unit can be observed through the eyepiece window irrespective of whether the finder shutter is in the open state or the closed state; and the imaging apparatus is configured so that the image displayed on the display unit and an optical image coming from the subject-side finder window and shining on the eyepiece window are superimposed on each other can be observed through the eyepiece window when the finder shutter is in the open state.

In the disclosed imaging apparatus, the imaging apparatus comprises a display control unit for displaying a shot image taken by the imaging device, during a movement of the variable magnification lens, immediately before a start of a movement of the variable magnification lens, on the display unit while enlarging or reducing it gradually; and the display control unit displays the shot image on the display unit while enlarging it gradually when the variable magnification lens is being moved in such a direction that the focal length of the finder device increases, and displays the shot image on the display unit while reducing it gradually when the variable magnification lens is being moved in such a direction that the focal length of the finder device decreases.

In the disclosed imaging apparatus, after a start of a movement of the variable magnification lens in such a direction that the focal length of the finder device increases, the display control unit displays the shot image while enlarging it gradually so that the shot image will be the same in size as an observation image that will be seen through the eyepiece window when the movement of the variable magnification lens is completed; and after a start of a movement of the variable magnification lens in such a direction that the focal length of the finder device decreases, the display control unit displays the shot image while reducing it gradually so that the shot image will be the same in size as a shooting range of an observation image that will be seen through the eyepiece window when the movement of the variable magnification lens is completed.

In the disclosed imaging apparatus, the variable magnification lens control unit starts a movement of the variable magnification lens when the focal length of the imaging optical system has been increased to reach a preset threshold value and when the focal length of the imaging optical system has been decreased to become smaller than a preset threshold value; information indicating a settable focal length range of the imaging optical system and a current focal length of the imaging optical system in the settable range is displayed on the display unit during a shooting operation; and pieces of information indicating the focal lengths as the threshold values which are within the settable range are displayed so as to be discriminated from pieces of information corresponding to other focal lengths.

In the disclosed imaging apparatus, the variable magnification lens control unit starts a movement of the variable magnification lens when the focal length of the imaging optical system has been increased to reach a preset threshold value and when the focal length of the imaging optical system has been decreased to become smaller than the threshold value ; and the imaging apparatus comprises a threshold value setting unit for setting the threshold value according to an external manipulation.

The disclosed imaging apparatus comprises a threshold value setting unit for setting the threshold value according to an external manipulation.

In the disclosed imaging apparatus, the finder device renders the finder shutter into the closed state and displays a shot image taken by the imaging device on the display unit when the focal length of the imaging optical system is in a range from its minimum value to a second threshold value that is smaller than the threshold value or in a range from a third threshold value that is larger than the threshold value to its maximum value; and the threshold value setting unit sets the threshold value, the second threshold value, and the third threshold value according to external manipulations.

In the disclosed imaging apparatus, if the focal length of the imaging optical system is changed during a movement of the variable magnification lens to a value that was employed before a start of the movement of the variable magnification lens, the variable magnification lens control unit controls the variable magnification lens so as to return it to a position where it was located at the time of the start of the movement.

In the disclosed imaging apparatus, the variable magnification lens control unit performs a control of prohibiting movement of the variable magnification lens in a moving image shooting mode in which to record a moving image.

INDUSTRIAL APPLICABILITY

The invention makes it possible to provide an imaging apparatus which can vary the finder magnification without causing an observer of a finder device to feel uncomfortable.

Although the invention has been described in detail by referring to the particular embodiment, it is apparent to those skilled in the art that various changes and modifications are possible without departing from the spirit and scope of the invention.

The present application is based on Japanese Patent Application No. 2011-213127 filed on Sep. 28, 2011, the disclosure of which is incorporated herein by reference.

DESCRIPTION OF SYMBOLS

10: Digital camera
15: Finder device
16: Subject-side finder window
17: Eyepiece window
32: CPU
53, 54: Driver
62: OVF shutter
64: Variable magnification lens

The invention claimed is:

1. An imaging apparatus having an imaging optical system whose focal length is variable, an imaging device which performs shooting through the imaging optical system, and a finder device which enables observation of a subject through an optical system that is different from the imaging optical system, wherein:
    the finder device comprises at least one variable magnification lens which can be inserted into and removed from an optical path of the finder device and serves to vary the focal length of the finder device, and a finder shutter which can switch between a closed state in which it interrupts light coming from a subject-side finder window of the finder device and thereby prohibits incidence of the light on an eyepiece window of the finder device and an open state in which it allows passage of light coming from the subject-side finder window and thereby causes the light to shine on the eyepiece window;
    the imaging apparatus comprises:
        a variable magnification lens control unit for controlling insertion and removal of the variable magnification lens in accordance with the focal length of the imaging optical system and changing the focal length of the finder device through the insertion or removal of the variable magnification lens; and
        a finder shutter control unit for controlling the state of the finder shutter; and
    the finder shutter control unit controls the finder shutter so that it is kept in the closed state while the variable magnification lens is being moved by the variable magnification lens control unit for its insertion or removal;
    the finder device includes a display unit for displaying an image;
    the image displayed on the display unit can be observed through the eyepiece window irrespective of whether the finder shutter is in the open state or the closed state;
    the imaging apparatus is configured so that the image displayed on the display unit and an optical image coming from the subject-side finder window and shining on the eyepiece window are superimposed on each other can be observed through the eyepiece window when the finder shutter is in the open state;
    the imaging apparatus comprises a display control unit for displaying a shot image taken by the imaging device, during a movement of the variable magnification lens, on the display unit while enlarging or reducing it gradually; and
    the display control unit displays the shot image on the display unit while enlarging it gradually when the variable magnification lens is being moved in such a direction that the focal length of the finder device increases, and displays the shot image on the display unit while reducing it gradually when the variable magnification lens is being moved in such a direction that the focal length of the finder device decreases.

2. The imaging apparatus according to claim 1, wherein after a start of a movement of the variable magnification lens in such a direction that the focal length of the finder device increases, the display control unit displays the shot image while enlarging it gradually so that the shot image will be the same in size as an observation image that will be seen through the eyepiece window when the movement of the variable magnification lens is completed, and wherein after a start of a movement of the variable magnification lens in such a direction that the focal length of the finder device decreases, the display control unit displays the shot image while reducing it gradually so that the shot image will be the same in size as a shooting range of an observation image that will be seen through the eyepiece window when the movement of the variable magnification lens is completed.

3. The imaging apparatus according to claim 1, wherein:
    the variable magnification lens control unit starts a movement of the variable magnification lens when the focal length of the imaging optical system has been increased to reach a preset threshold value and when the focal length of the imaging optical system has been decreased to become smaller than a preset threshold value;
    information indicating a settable focal length range of the imaging optical system and a current focal length of the imaging optical system in the settable range is displayed on the display unit during a shooting operation; and
    pieces of information indicating the focal lengths as the threshold values which are within the settable range are displayed so as to be discriminated from pieces of information corresponding to other focal lengths.

4. The imaging apparatus according to claim 3, wherein the imaging apparatus comprises a threshold value setting unit for setting the threshold value according to an external manipulation.

5. The imaging apparatus according to claim 1, wherein:
    the variable magnification lens control unit starts a movement of the variable magnification lens when the focal length of the imaging optical system has been increased to reach a preset threshold value and when the focal length of the imaging optical system has been decreased to become smaller than the threshold value; and
    the imaging apparatus comprises a threshold value setting unit for setting the threshold value according to an external manipulation.

6. The imaging apparatus according to claim 5, wherein:
    the finder device renders the finder shutter into the closed state and displays a shot image taken by the imaging device on the display unit when the focal length of the imaging optical system is in a range from its minimum value to a second threshold value that is smaller than the threshold value or in a range from a third threshold value that is larger than the threshold value to its maximum value; and the threshold value setting unit sets the threshold value, the second threshold value, and the third threshold value according to external manipulations.

7. The imaging apparatus according to claim 1, wherein if the focal length of the imaging optical system is changed during a movement of the variable magnification lens to a value that was employed before a start of the movement of the variable magnification lens, the variable magnification lens control unit controls the variable magnification lens so as to return it to a position where it was located at the time of the start of the movement.

8. The imaging apparatus according to claim 1, wherein the variable magnification lens control unit performs a control of prohibiting movement of the variable magnification lens in a moving image shooting mode in which to record a moving image.

9. An imaging apparatus having an imaging optical system whose focal length is variable, an imaging device which performs shooting through the imaging optical system, and a finder device which enables observation of a subject through an optical system that is different from the imaging optical system, wherein:
the finder device comprises at least one variable magnification lens which can be inserted into and removed from an optical path of the finder device and serves to vary the focal length of the finder device, and a finder shutter which can switch between a closed state in which it interrupts light coming from a subject-side finder window of the finder device and thereby prohibits incidence of the light on an eyepiece window of the finder device and an open state in which it allows passage of light coming from the subject-side finder window and thereby causes the light to shine on the eyepiece window;
the imaging apparatus comprises:
a variable magnification lens control unit for controlling insertion and removal of the variable magnification lens in accordance with the focal length of the imaging optical system and changing the focal length of the finder device through the insertion or removal of the variable magnification lens; and
a finder shutter control unit for controlling the state of the finder shutter; and
the finder shutter control unit controls the finder shutter so that it is kept in the closed state while the variable magnification lens is being moved by the variable magnification lens control unit for its insertion or removal;
the variable magnification lens control unit starts a movement of the variable magnification lens when the focal length of the imaging optical system has been increased to reach a preset threshold value and when the focal length of the imaging optical system has been decreased to become smaller than a preset threshold value;
information indicating a settable focal length range of the imaging optical system and a current focal length of the imaging optical system in the settable range is displayed on the display unit during a shooting operation; and
pieces of information indicating the focal lengths as the threshold values which are within the settable range are displayed so as to be discriminated from pieces of information corresponding to other focal lengths.

10. An imaging apparatus having an imaging optical system whose focal length is variable, an imaging device which performs shooting through the imaging optical system, and a finder device which enables observation of a subject through an optical system that is different from the imaging optical system, wherein:
the finder device comprises at least one variable magnification lens which can be inserted into and removed from an optical path of the finder device and serves to vary the focal length of the finder device, and a finder shutter which can switch between a closed state in which it interrupts light coming from a subject-side finder window of the finder device and thereby prohibits incidence of the light on an eyepiece window of the finder device and an open state in which it allows passage of light coming from the subject-side finder window and thereby causes the light to shine on the eyepiece window;
the imaging apparatus comprises:
a variable magnification lens control unit for controlling insertion and removal of the variable magnification lens in accordance with the focal length of the imaging optical system and changing the focal length of the finder device through the insertion or removal of the variable magnification lens; and
a finder shutter control unit for controlling the state of the finder shutter; and
the finder shutter control unit controls the finder shutter so that it is kept in the closed state while the variable magnification lens is being moved by the variable magnification lens control unit for its insertion or removal;
the variable magnification lens control unit starts a movement of the variable magnification lens when the focal length of the imaging optical system has been increased to reach a preset threshold value and when the focal length of the imaging optical system has been decreased to become smaller than the threshold value; and
the imaging apparatus comprises a threshold value setting unit for setting the threshold value according to an external manipulation.

* * * * *